US008648813B2

(12) United States Patent
Van Meeteren

(10) Patent No.: US 8,648,813 B2
(45) Date of Patent: Feb. 11, 2014

(54) APPARATUS FOR PROCESSING INPUT DATA

(76) Inventor: Albertus Petrus George Van Meeteren, Diemen (NL)

( * ) Notice: Subject to any disclaimer, the term of this patent is extended or adjusted under 35 U.S.C. 154(b) by 671 days.

(21) Appl. No.: 12/596,021

(22) PCT Filed: Apr. 22, 2008

(86) PCT No.: PCT/NL2008/050234
§ 371 (c)(1),
(2), (4) Date: Dec. 29, 2009

(87) PCT Pub. No.: WO2008/133505
PCT Pub. Date: Nov. 6, 2008

(65) Prior Publication Data
US 2010/0127982 A1 May 27, 2010

(30) Foreign Application Priority Data

May 1, 2007 (NL) ...................................... 2000621

(51) Int. Cl.
*G06F 3/041* (2006.01)
(52) U.S. Cl.
USPC ............................ 345/173; 345/156; 715/863
(58) Field of Classification Search
USPC .................................. 345/173, 156; 715/863
See application file for complete search history.

(56) References Cited

U.S. PATENT DOCUMENTS 5,214,428 A    5/1993  Allen
6,094,197 A *  7/2000  Buxton et al. ................. 715/863

FOREIGN PATENT DOCUMENTS

EP    0723217 A1    7/1996
GB    2317092 A     3/1998

* cited by examiner

*Primary Examiner* — Latanya Bibbins
(74) *Attorney, Agent, or Firm* — The Webb Law Firm

(57) ABSTRACT

An apparatus for processing input data by means of instructions and outputting the processed data, comprising a central data processing unit, memory means in which the instructions are stored, data input means for inputting the data, and data output means for outputting the processed data, wherein said data input means are arranged for detecting a user's input motion in at least two dimensions, and wherein said data processing unit is arranged for determining representatives of the directions of the detected input motion, wherein the data processing unit is furthermore arranged for carrying out a predetermined instruction from the memory in dependence on the determined values of the representatives of the directions of the input motion and, providing a minimum length or direction has been exceeded, independently of the length or direction of the input motion.

19 Claims, 5 Drawing Sheets

APPARATUS FOR PROCESSING INPUT DATA

BACKGROUND OF THE INVENTION

1) Field of the Invention

The invention relates to an apparatus for processing input data by means of instructions and outputting the processed data, comprising a central data processing unit, memory means in which the instructions are stored, data input means for inputting the data, and data output means for outputting the processed data, said data input means being arranged for detecting a user's input motion in at least two dimensions, said data processing unit being arranged for determining representatives of the directions of the detected input motion and carrying out a predetermined instruction from the memory in dependence on the determined values of the representatives of the directions of the input motion and, providing a minimum length or duration has been exceeded, independently of the length or duration of the input motion and in dependence on an input cycle consisting of a starting direction and at least one continuation direction of the input motion deviating from said starting direction.

2) Description of Related Art

Such an apparatus is known, for example from U.S. Pat. No. 6,094,197.

Generally a display screen is used as a data output means. The display screen visualises the result of the computer's calculations. The display screen may function as an auxiliary device of data input means, such as a keyboard and a mouse. The display screen may also function as an independent data input means, however. The user gives apparatus that makes use of the display screen commands in that case by touching the screen by hand or with a stylus.

The possibility to give the apparatus commands by touching the screen is currently being used in that proposals for commands are made on parts of the screen in the form of simulated buttons and the like, or in that movements made across the screen (a drawing, for example letters) are registered and retained.

The first technique is applied on a so-called "touchscreen". Touching as a rule takes place by hand. The technique is frequently available in the public domain in the form of automated teller machines, museum presentations and the like. Simulated buttons on a screen are also used in support of data input means, such as the "mouse".

The second technique is used in, for example, Personal Digital Assistants, tablet PCs, Computer Aided Design and electronic books. Usually a stylus is used with these applications. The sensitive screen is regarded as a piece of paper in those cases, on which tracks are drawn; a user draws or writes on the screen.

The first technique requires the user to move his or her hand directly or via the mouse to a defined position on the screen to give a command. The second technique is limited to the forming of images. Said images can only be converted into more clearly defined instructions to the apparatus in an indirect manner.

SUMMARY OF THE INVENTION

The object of the invention is to improve the prior art, in particular to eliminate the above limitations, and to provide a more efficient, easier and/or simpler apparatus for processing input data.

In order to accomplish that object, the input cycle of the input device of the kind referred to in the introduction comprises a predetermined number of directions. Because of this manner of giving instructions, the inputting of an instruction takes place independently of the position on the writing area of the screen where it is given; the instruction is only related to the direction of the input motion. For example, the input cycle comprises two directions (or turns). In that case two operations suffice for entering an input cycle which is to lead to an instruction being carried out; selecting a writing direction and changing the writing direction.

Preferably, the data processing unit is arranged for regarding a representative of a direction of an input motion as the start of a new input cycle once the preceding input cycle has been completed. This will result in a fixed input motion rhythm, in which each set of at least two operations, viz. selecting a direction and changing said direction, will lead to an instruction being carried out.

Preferably, the input script attaches meaning to eight directions: four starting directions and four continuation directions. The option to choose from sets of four possible directions each time and a cycle of two motions within one input cycle results in a total of sixteen different input cycles. In addition to that, a distinction may be made between the hand (left hand or right hand) used for writing an input cycle. This leads to a doubling of the number of possible input cycles, viz. thirty-two. Based on said thirty-two possible input cycles, the computer instructions are divided into clusters of thirty-two each. The number of possible input cycles can be increased by providing a data input means with several writing areas, or by adapting several data input means to that effect.

Preferably, the starting directions are at least substantially perpendicular to each other, and the continuation directions are preferably turned 45° relative to the starting directions. In this way an input cycle consists of a horizontal or vertical starting direction, for example, and a continuation direction deviating therefrom, for example being turned 45° relative to the starting directions.

Preferably, the data processing unit is arranged for regarding a representative of at least one second direction of an input motion as the representative of a continuation direction of an input cycle when said direction at least substantially corresponds to a direction from a group of continuation directions that deviate from the directions of the group of starting directions. More preferably, the data processing unit is arranged for regarding a representative of a direction of an input motion as the start of a new input cycle when said direction at least substantially corresponds to a direction from a group of predetermined starting directions. If a starting direction is input again after a starting direction has been input, and this takes place before the predetermined number of turns or directions within an input cycle have been made, said second starting direction will be regarded as the start of a new input cycle.

Preferably, the data processing unit is furthermore arranged for only regarding a representative of at least one second direction of an input motion as a representative of a new direction when said direction at least substantially deviates from the preceding direction for a minimum length or duration. A margin is required within which a deviation from the straight line is not yet regarded as a selection of another direction. Without such a margin, the user would be forced to draw taut lines, without any tremor or hesitation, making exactly the right angles in the writing motion. The user sets this margin, thereby determining the minimum length of a direction upon giving commands to the data processing unit. The fact is that he determines the width of the area within which a change of direction is not yet understood to be a selection of a next input motion. The minimum distance to be covered is the root of twice the square of the adjusted margin (Pythagoras). The width of the boundary surface is twice the adjusted margin.

The user can determine a maximum length of the motion. When said maximum length is exceeded, this is communicated to the user by an output means, preferably during the length of the margin referred to in the preceding paragraph or, if desired, a multitude thereof. After said margin or the multitude thereof has been covered, the newly selected direction is determined by the direction of the input motion at the moment said additional distance has been covered as well.

For detecting a starting direction, the writing area is preferably regarded as a square which is divided into four parts by the two diagonals. For detecting the continuation direction, the writing area is regarded as a square which is divided into four parts by the axial lines. When the adjusted margin is exceeded, the moving part of the input means is located at the position where the two virtual lines intersects within the virtual writing area for the next input motion. Said fictitious next writing area is considered to extend at an angle of 45 degrees relative to the fictitious writing area being exited, during the length of the motion required for reaching the boundary of the new boundary area. As a result of said fictitious relative rotation of the writing area under the moving input means, the shortest stretch for reaching the adjusted boundary line continues to make an angle of 45 degrees, or a multitude thereof, relative to the preceding direction of movement.

Preferably, a registration takes place of the length of the stretches the user needed to reach the point where changes of direction became final as a result of the boundary line being reached. On the basis of these registrations a calculation is made of the angle the virtual writing area needs to extend at with each individual direction so as to achieve that the writing hand will find the shortest route for indicating the selected direction. As a result of this provision, a spontaneous adaptation to the user's writing hand will take place.

Preferably, at least one of the input cycles refers to another cluster of input cycles. All input cycles are interconnected by means of such referring input cycles. The clusters are grouped in a hierarchical relationship. There is one central coordinating cluster. Preferably, the representative of at least one second direction of an input cycle is determined as a relative deviation from the representative of the preceding direction. In this way the input cycle to be formed, in addition to being independent of the length of the input motion, is also independent of the selected starting direction; only the relative deviation from a direction constitutes an input cycle.

Preferably, the data input means comprise a mouse, a trackball, a joystick or a similar data input device, since such input devices are also suitable for inputting directions.

The data input means preferably also comprise means for outputting data, for example a touchscreen. Preferably, the data output means provide information regarding the current phase of the input cycle. Thus, the user can be offered a selection of the various starting directions and continuation directions, and the related instructions, at the location where the instruction is formed on the touchscreen.

The instructions in the memory means preferably comprise the placing of characters. Preferably, the instructions in the memory means comprise arithmetic instructions. More preferably, the instructions in the memory means comprise typographic format instructions.

Preferably, the instructions in the memory means furthermore comprise instructions for assigning commands in digital files being read (among which computer programmes) to input cycles. The instructions in the memory means also comprise instructions for presenting the meaning of every command that can be retrieved at any moment by means of a specific input cycle on the data output means of the data input means or on another data output means. If several clusters of commands are recognized, links are established between said clusters via one or more input cycles belonging to a cluster. The user is informed of the presence of clusters and of the input cycles by means of which said clusters can be opened up on the data output means of the data input means and/or on other data output means. It may also be decided to realise the hierarchical relations between the clusters by means of a separate network of input cycles. Such a separate network can be assigned to a separate writing area.

Preferably, at least some of the instructions in the memory means comprise a series of sub-instructions. The apparatus preferably comprises means for storing the directions of input cycles in macro files. Furthermore preferably, the instructions in the memory means comprise the execution of the macro files. The macro files consist of a list of the selected input cycles. It is noted that a macro can be fully recorded, in contrast to a data processing unit, which is controlled by a mouse. There is no need to record complicated mouse pointer tracks (mouse movements) across the screen, which is currently the reason why mouse movements are not included in macros. The length of the detected motions is irrelevant in the present invention, since only the direction in which the input cycle starts and the turn made in the input cycle are relevant. The macro files can be processed. A macro language is available for that purpose.

Preferably, the data input means comprises one or more energy supply means, one or more data processing units geared to the purpose of the data input means, and also one or more memory means geared to said purpose. As a result, data can be input by the input means and macros recorded herewith out the data processing device itself being activated. Furthermore, using the stored macro, input can take place at a location other than the location of the data processing apparatus, whilst the data processing apparatus itself is active for commands other than the receiving of commands.

Preferably, the memory means of the data input means comprise instructions for converting input cycles into keystroke codes as defined for the "QWERTY" keyboard or other standard keyboards. This makes it possible to use the data input means also with data processing apparatuses other than the one described herein.

The input means preferably comprise separate input means for the left hand and for the right hand. Preferably, two sets of instructions to be executed by the respective hands are stored in the memory means. In this way it is possible to form twice sixteen different input cycles, using two input means, for example styluses, in the case of one starting direction and one continuation direction.

Preferably, input cycles can also be formed by means of a keyboard. The sixteen times two input cycles mentioned above by way of example give access to all possible instructions. Said thirty-two input cycles can be assigned to thirty-two keys on a keyboard. A few keys may be added to said thirty-two keys, to which generic commands can be assigned. Preferably it is also possible to form input cycles, using four keys. Preferably it is also possible to form input cycles by means of a key which is capable of detecting pressure differences between key parts.

It is noted, unnecessarily, that the apparatus for processing input data can function independently, but that it may also be used as an auxiliary device for other apparatuses.

BRIEF DESCRIPTION OF THE DRAWINGS

The invention will be explained in more detail below with reference to figures illustrated in the drawing, in which.

DETAILED DESCRIPTION OF THE INVENTION

Figure 1:
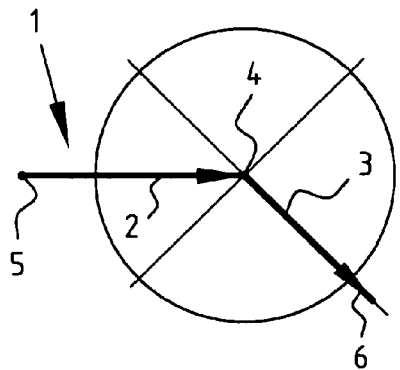
FIG. 1 schematically shows an input cycle.

FIG. 1 schematically shows an input cycle 1. The input motion is started at a position 5 and a direction is selected: a starting direction 2. At position 4 a new direction to a position 6 is selected: a continuation direction 3. An input cycle 1 thus consists of selecting the starting direction 2 and deviating therefrom in the continuation direction 3.

Figure 2:
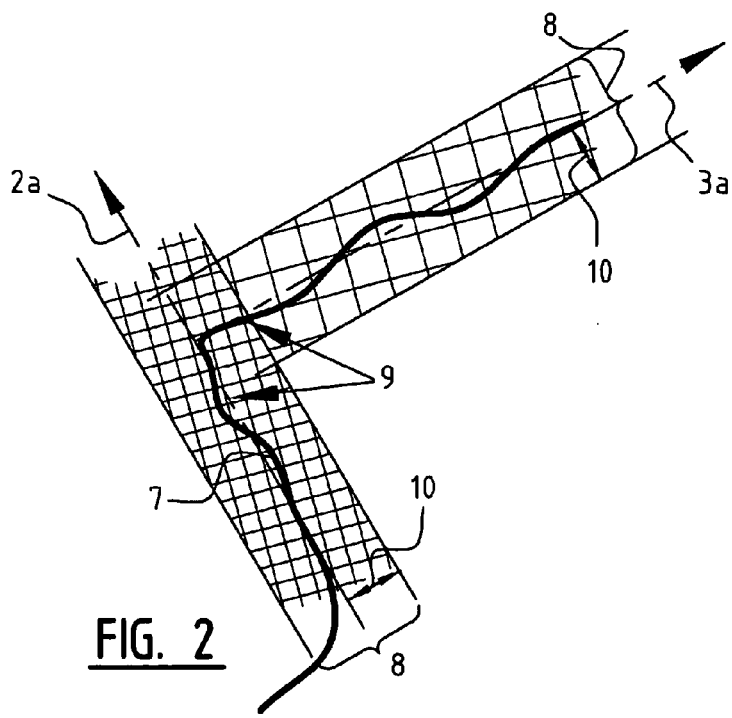
FIG. 2 schematically shows the margin for deviation from a straight line.

FIG. 2 schematically shows a margin 8 within which a deviation from a straight line is not interpreted as a direction selection yet. Said margin 8 is set by the user and thus determines a minimal length 10 of a direction. The margin 8 is set for the minimum length 10 of the line that extends at right angles to the direction 2a or 3a from the current position. The more acute the angle that a write line 7 makes with respect to the direction of motion 2a or 3a, the longer an actual change of direction 9 will be. If the change of direction 9 equals the minimum length 10, it is not clear which direction of the two is being selected. The user is informed of this uncertainty via a screen. He solves the problem that has arisen by making an unmistakable turn (ninety degrees) to the left or to the right.

Figure 3:
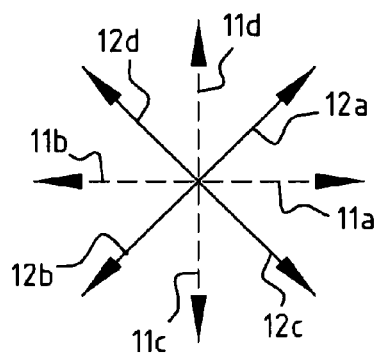
FIG. 3 schematically shows the eight directions of the input motion.

The script according to the invention attaches meaning to eight directions, which directions are shown in FIG. 3. The four starting directions 11a-d extend perpendicularly to each other in horizontal and vertical direction, and the continuation directions 12a-d are turned 45° with respect to the starting directions 11a-d. An input cycle always begins with one of the four starting directions 11a-d and subsequently a change of direction in one of the continuation directions 12a-d takes place, thus completing the input cycle. If a starting direction 11a-d is selected again after one of the starting directions 11a-d, this is regarded as the start of a new input cycle.

Figure 10:
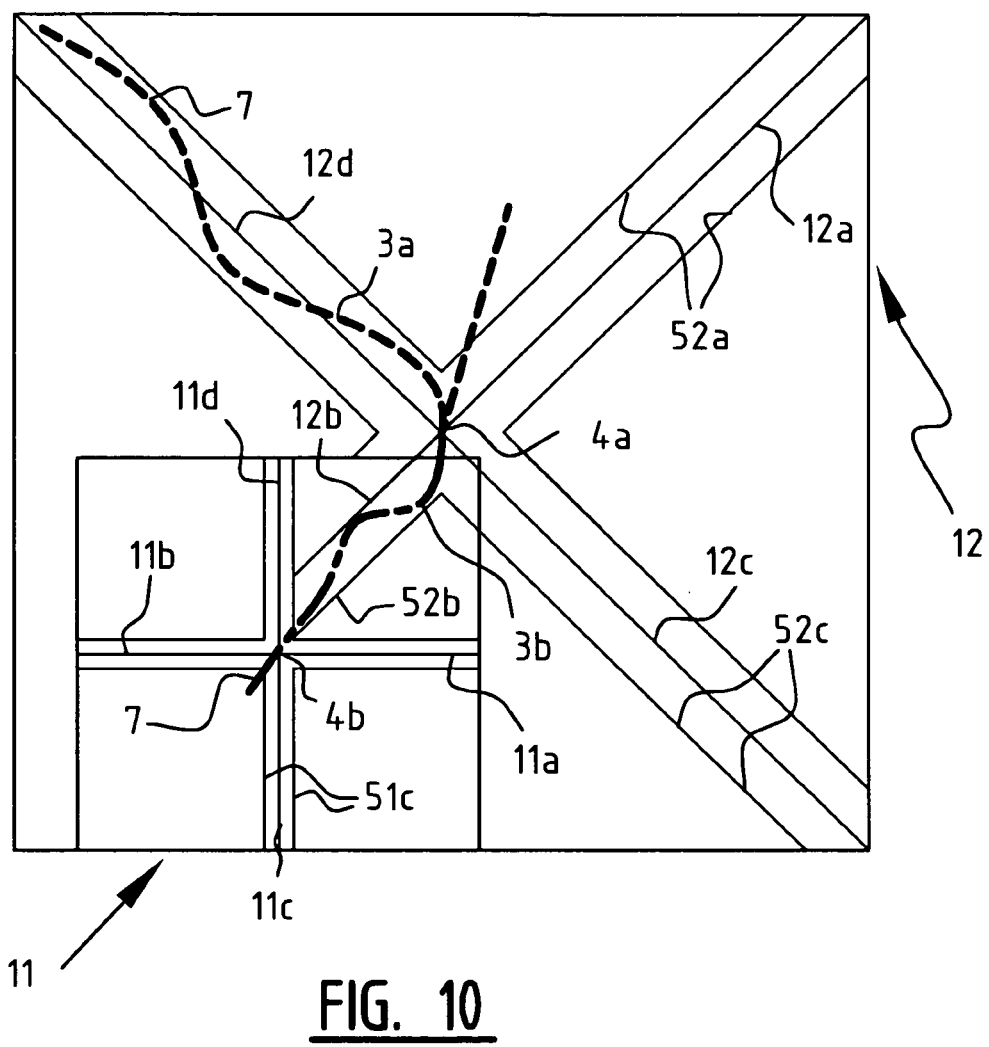
FIG. 10 shows an input motion with the starting and continuation directions.

FIG. 10 shows the write line 7 from the left-hand top corner. Continuation directions 12 and starting directions 11 are drawn in the figure. Of said starting and continuation directions 11a-d and 12a-d, margins 51a-d and 52a-d, respectively, are indicated. A direction 3a initially follows the continuation direction 12d, from which it deviates at a position 4a, after which a direction 3b has the continuation direction 12b. When the write line 7 crosses the margin 52 of the continuation direction at a position 4b, the user can select a direction from the starting directions 11, which are drawn around position 4b. By selecting one of the directions 11a-d, a new input cycle is initiated. It should be noted that in this example an input cycle consists of three directions, one starting direction (not shown) and two directions 3a and 3b with continuation directions 12d and 12b.

Figure 4:
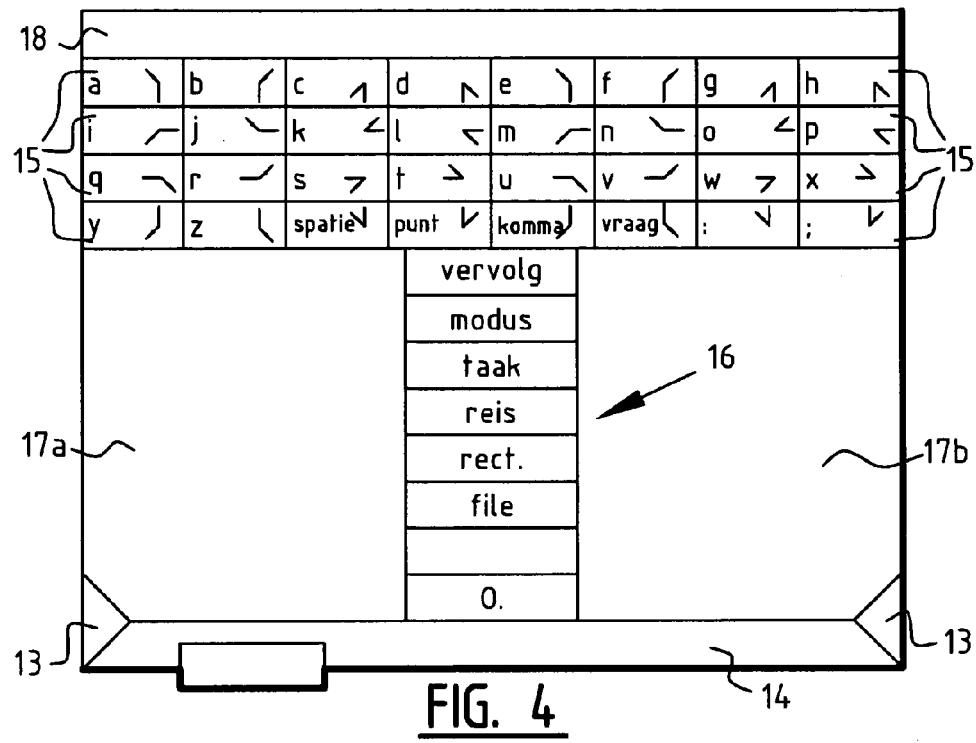
FIG. 4 schematically shows a screen structure for use in the invention.

FIG. 4 shows a screen for inputting and outputting, for example a touchscreen, which is to be used use with the invention. The screen has an on/off button (optionally: a button by means of which a user can switch between stylus control and finger control). In addition to that, help function buttons 13 are projected on the left and on the right. At the bottom of the screen is a status bar 14 and a box 18 for displaying the result of an instruction at the top of the screen. Also present at the top of the screen are thirty-two information boxes 15, one for each input cycle, which may also be touch-controlled, if desired. In the centre are eight virtual keys 16. Said keys 16 are used for giving generic commands by touching the screen. Writing on the screen will be done with two digital pens (styluses), one in each hand, in the boxes 17a and 17b provided on the left and on the right for this purpose. In this way it does not matter when using the screen whether the user prefers the left or the right. The user can set the screen according to his or her preferences.

FIGS. 5-8 show an example of the inputting of word processing instructions, using the script according to the invention.

Figure 5:
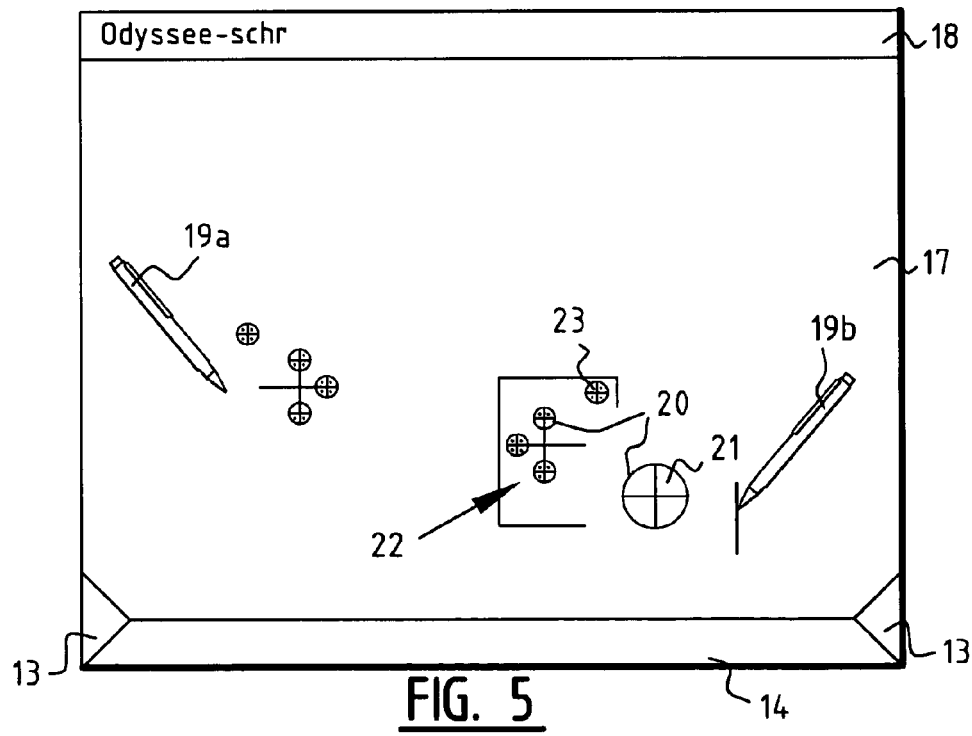
FIGS. 5-8 schematically show an example of the use of the script according to the invention.

When a stylus 19a or 19b is placed on the screen as shown in FIG. 5, the instructions to be found under the four directions will be displayed on the screen round a stylus 19a or 19b. Four passage circles 22 comprise symbols which represent the instructions that will be carried out when the user selects the direction to the circle or quadrant in question. For the sake of legibility (screened off by the writing hand), a right-hand circle has been moved upward. For the left hand, the left-hand circle is moved in this way. The user can elect to turn off the instruction regarding directions to be selected and/or the information windows. He can reactivate the function by touching one of the two help buttons 13.

The left-hand stylus 19a is stationary. The right-hand stylus 19b has subsequently made an upward movement, the starting direction 11d in FIG. 3. As a result, an upper circle 20 has become active. The letter being sought (the "i") is located in a top right quadrant 21 in this example.

Figure 6:
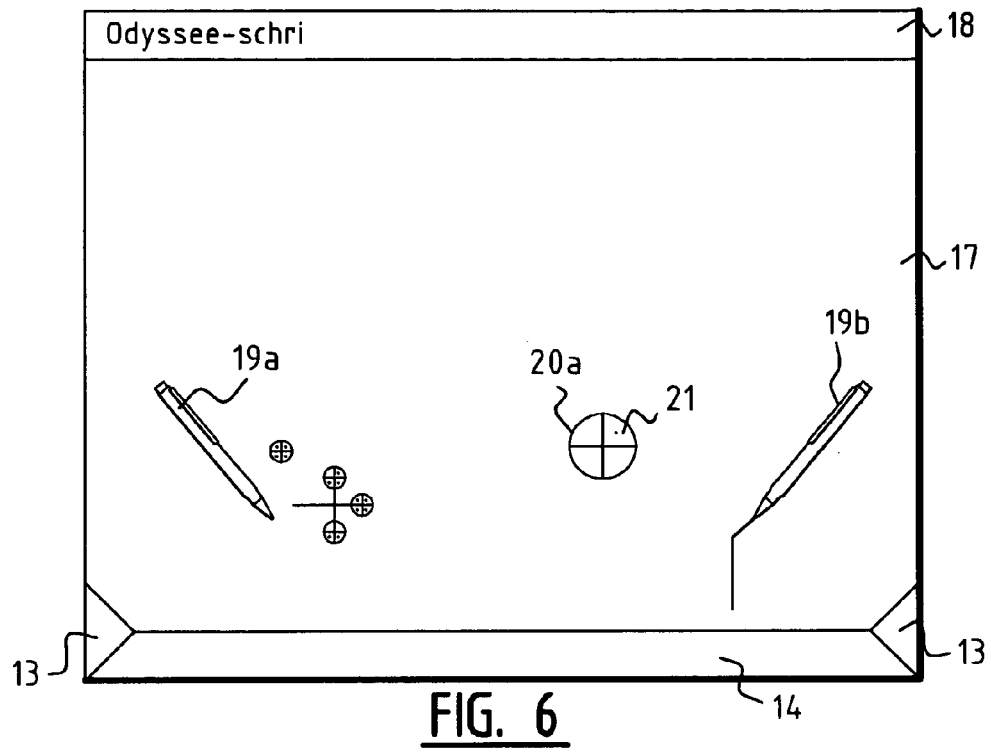

In FIG. 6 the stylus 19b is being drawn upwards to the right, the continuation direction 12a of FIG. 3. The "i" is placed at the location in the box 18. The text moves to the left. The next letter can be selected.

Figure 7:
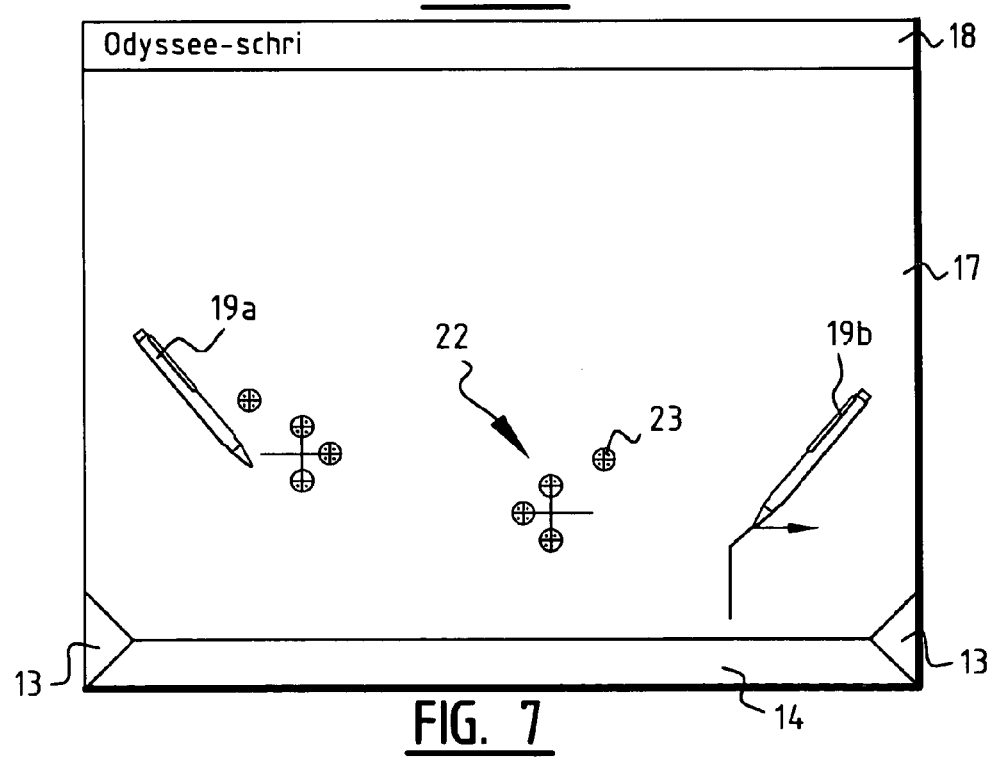

In FIG. 7 the letter "f" is sought. After the instruction "i", the circle 20a on the right has made way for the passage circles 22, which are associated with the initial phase of an input cycle. The letter "f" is located in the right-hand circle 23 in this example.

Figure 8:
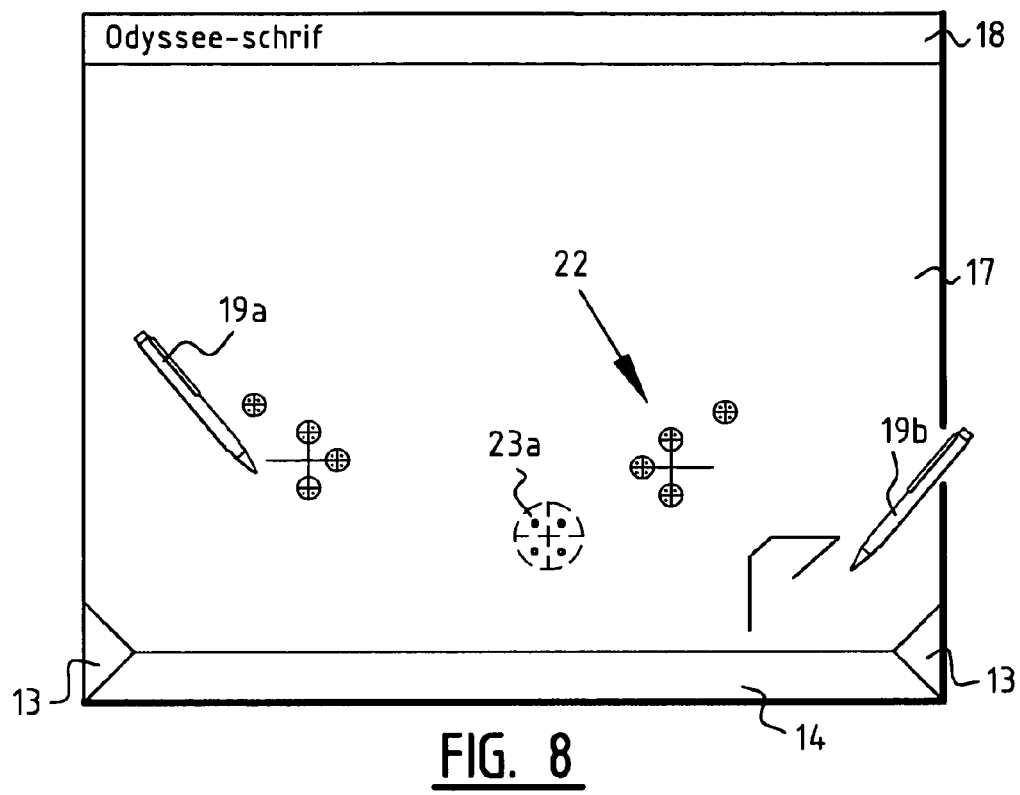

In FIG. 8 the command to present the "f" on the screen is given by making a movement in the direction of the left-hand bottom corner, the continuation direction 12b of FIG. 3. The user derives this information either from a circle 23a that appeared after the initial phase or from a relevant information window. In the drawing, the movement has been made to the "f" instruction. The requested "f" has been written. The text in the box 18 has moved further to the left. The active circle 23a has disappeared from the screen again (a shadow of said circle is shown for the sake of clarity of this presentation). The menu circles 22 are ready for the next letter, the "t".

Figure 9:
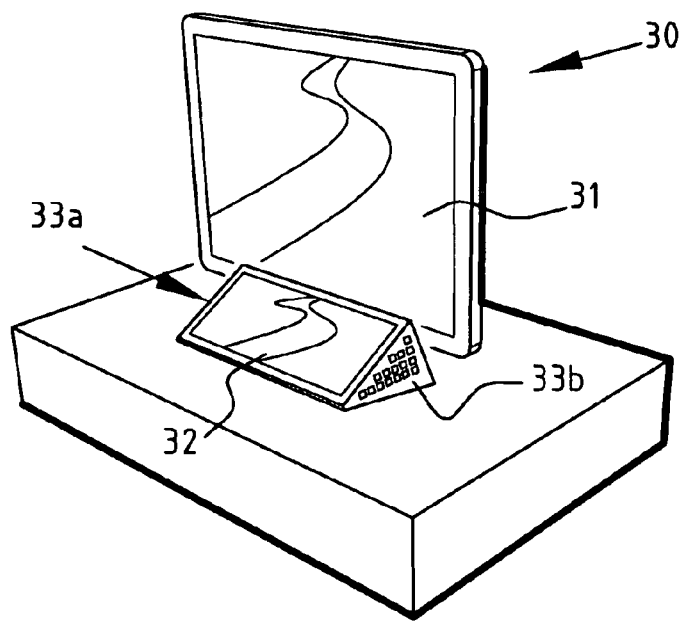
FIG. 9 schematically shows a set-up according to the invention.

FIG. 9 shows an apparatus 30 according to the invention. The apparatus 30 consists of a presentation screen 31 and an input screen 32. At the back of the input screen 32, on the sides 33a and 33b, keys are provided by means of which input cycles can be input more quickly. The input screen 32 consists of a touchscreen, on which a user can write by means of styluses 19a and 19b.

The invention claimed is:

1. An apparatus for processing input data by instructions and outputting the processed data, the apparatus comprising:
    a central data processing unit;
    memory means for storing the instructions;
    data input means for inputting the data; and
    data output means for outputting the processed data, wherein:

the data input means is configured to detect an input motion of a user in at least two dimensions;

the data processing unit is configured to determine representatives of directions of the detected input motion and to carry out a predetermined instruction from the memory based on the determined representatives of the directions of the detected input motion and, providing that a minimum length or duration has been exceeded, independently of a length or duration of the detected input motion on an input cycle comprised of a starting direction and at least one continuation direction of the input motion deviating from the starting direction;

the input cycle comprises a predetermined number of directions; and the data processing unit is configured to recognize a representative of a direction of an input motion as a start of a new input cycle once a preceding input cycle has been completed in response to a starting direction of the input motion of the new input cycle being continuous with a final continuation direction of the preceding input cycle.

2. The apparatus according to claim 1, wherein the data processing unit is configured to recognize a representative of a direction of an input motion as the start of an input cycle when the direction at least substantially corresponds to a direction from a group of predetermined starting directions.

3. The apparatus according to claim 2, wherein the data processing unit is configured to recognize a representative of at least one second direction of an input motion as the representative of a continuation direction of an input cycle when the direction at least substantially corresponds to a direction from a group of continuation directions that deviate from the directions from the group of starting directions.

4. The apparatus according to claim 3, wherein the continuation directions are turned 45° relative to the starting directions.

5. The apparatus according to claim 2, wherein the starting directions are at least substantially perpendicular to each other.

6. The apparatus according to claim 1, wherein the data processing unit is configured to only recognize a representative of at least one second direction of an input motion as the representative of a new direction when the direction at least substantially deviates from the preceding direction for a minimum length or duration.

7. The apparatus according to claim 6, wherein the representative of at least one second direction of an input cycle is determined as a relative deviation from the representative of a preceding direction.

8. The apparatus according to claim 1, wherein the data input means comprise a mouse or a trackball.

9. The apparatus according to claim 1, wherein input cycles are formed by means of a keyboard.

10. The apparatus according to claim 1, wherein the data input means also comprise means for outputting data including a touchscreen.

11. The apparatus according to claim 1, wherein the data output means provides information regarding the current phase of the input cycle.

12. The apparatus according to claim 1, wherein the instructions in the memory means comprise the placement of characters.

13. The apparatus according to claim 1, wherein the instructions in the memory means comprise arithmetic instructions.

14. The apparatus according to claim 1, wherein the instructions in the memory means comprise typographic format instructions.

15. The apparatus according to claim 1, wherein at least some of the instructions in the memory means comprise a series of sub-instructions.

16. The apparatus according to claim 1, wherein the input means comprises separate input means for the left hand and for the right hand of the user.

17. The apparatus according to claim 16, wherein two sets of instructions to be carried out by the different hands are stored in the memory means.

18. The apparatus according to claim 1, wherein the apparatus comprises means for storing the directions of input cycles in macro files.

19. The apparatus according to claim 18, wherein the instructions in the memory means comprise an execution of the macro files.

* * * * *

UNITED STATES PATENT AND TRADEMARK OFFICE
CERTIFICATE OF CORRECTION

PATENT NO. : 8,648,813 B2
APPLICATION NO. : 12/596021
DATED : February 11, 2014
INVENTOR(S) : Albertus Petrus George Van Meeteren It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 957 days.

Signed and Sealed this

Twenty-ninth Day of September, 2015

Michelle K. Lee
*Director of the United States Patent and Trademark Office*